United States Patent [19]

McCallum et al.

[11] Patent Number: 5,690,889

[45] Date of Patent: Nov. 25, 1997

[54] PRODUCTION METHOD FOR MAKING RARE EARTH COMPOUNDS

[75] Inventors: R. William McCallum; Timothy W. Ellis; Kevin W. Dennis; Robert J. Hofer; Daniel J. Branagan, all of Ames, Iowa

[73] Assignee: Iowa State University Research Foundation, Inc., Ames, Iowa

[21] Appl. No.: 605,324

[22] Filed: Feb. 15, 1996

[51] Int. Cl.$^6$ .................................................. C22C 38/00
[52] U.S. Cl. ............................. 420/83; 420/580; 420/581; 148/301; 148/302; 423/21.1
[58] Field of Search ....................... 148/301, 302, 148/303; 423/21.1; 420/55, 81, 580, 581, 83

[56] References Cited

U.S. PATENT DOCUMENTS

| | | | |
|---|---|---|---|
| 4,837,109 | 6/1989 | Tokunaga et al. | 148/302 |
| 5,248,328 | 9/1993 | He et al. | 423/21.1 |

FOREIGN PATENT DOCUMENTS

| | | | |
|---|---|---|---|
| 58-167417 | 10/1983 | Japan | 423/21.1 |
| 1772829 A1 | 10/1992 | U.S.S.R. | 148/302 |
| WO91/04945 | 4/1991 | WIPO | 423/21.1 |

OTHER PUBLICATIONS

Nouvelle Methode De Preparation Des Metaux Des Terres Rares. (New Method of Preparing Rare Earth Metals); Proc. Rare Earth Res. Conf., 12th vol. 1, 490–503, English Abstract, 1976.

*Primary Examiner*—John Sheehan
*Attorney, Agent, or Firm*—Edward J. Timmer

[57] ABSTRACT

A method of making a rare earth compound, such as a earth-transition metal permanent magnet compound, without the need for producing rare earth metal as a process step, comprises carbothermically reacting a rare earth oxide to form a rare earth carbide and heating the rare earth carbide, a compound-forming reactant (e.g. a transition metal and optional boron), and a carbide-forming element (e.g. a refractory metal) that forms a carbide that is more thermodynamically favorable than the rare earth carbide whereby the rare earth compound (e.g. $Nd_2Fe_{14}B$ or $LaNi_5$) and a carbide of the carbide-forming element are formed.

16 Claims, No Drawings

PRODUCTION METHOD FOR MAKING RARE EARTH COMPOUNDS

CONTRACTURAL ORIGIN OF THE INVENTION

The United States Government has rights in this invention pursuant to Contract No. W-7405-ENG-82 between the Department of Energy and Iowa State University, which contract grants to the Iowas State University Research Foundation, Inc. the right to apply for this patent.

FIELD OF THE INVENTION

The present invention relates to the manufacture of rare earth-bearing materials and, more particular, to rare earth-transition metal compounds, such as for example, $Nd_2Fe_{14}B$ and $LaNi_5$, that are useful as respective permanent magnet or hydrogen storage materials.

BACKGROUND OF THE INVENTION

The manufacture of rare earth-bearing permanent magnet materials, such as for example, $Nd_2Fe_{14}B$, typically is achieved by charging rare earth metal in elemental form and the other components of the permanent magnet material (e.g. Fe and B) to a melting vessel and melting the charges to form a melt that is then rapidly solidified by melt spinning, inert gas atomization, or other rapid solidification technique to provide ribbon or particulates comprising the desired hard permanent magnet phase (e.g. $Nd_2Fe_{14}B$ phase).

These production methods for rare earth-transition metal permanent magnet materials are disadvantageous in that rare earth metal in elemental form is used as a charge for melting with the other alloy components. The production of the rare earth in elmental form is costly and adds to the cost of making permanent magnet materials in the manner described hereabove.

An object of the present invention is to provide a method of making rare earth-bearing materials such as are useful as magnetic materials, hydrogen storage materials, and other uses without the need to produce the rare earth metal in elemental form.

SUMMARY OF THE INVENTION

The present invention provides a method of making such rare earth-bearing materials without the need to produce rare earth metal as a process step. The present invention involves in one embodiment carbothermic reaction of a rare earth oxide to provide a rare earth carbide and then reaction of the rare earth carbide, a strong carbide forming element, and a compound-forming element to produce the desired rare earth compound and a carbide of the carbide-forming element.

In a particular embodiment of the present invention, the rare earth oxide (e.g. $Nd_2O_3$) is carbothermically reacted with a solid or gaseous reactant comprising carbon (for example, carbon particulates) to form a rare earth carbide (e.g. $NdC_2$ or $NdC_3$). The rare earth carbide is mixed in appropriate proportions with reactants which can include, for example, Fe or other transition metal, optional B, and a refractory metal which is a stronger carbide former than the rare earth metal (i.e. more thermodynamically favorable carbide former). The mixture is heated to a reaction temperature to form a refractory metal carbide and a rare earth-transition metal compound which may include boron (if boron is present), such as $Nd_2Fe_{14}B$, which is a magnet material or $LaNi_5$, which is hydrogen stroage material.

The present invention will be better understood with reference to the following detailed description.

DETAILED DESCRPITION OF THE INVENTION

The present invention provides a method of making rare earth-bearing compounds, such as rare earth-transition metal compounds, at reduced cost. Rare earth-transition metal compounds useful as magnetic materials are made by the present invention without the need to produce rare earth metal as a process step as required heretofore in the manufacture of such materials.

In accordance with an embodiment of the present invention, a rare earth oxide is reacted with carbon in elemental form (e.g. solid graphite or amorphous carbon) or gaseous form (e.g. methane or carbon monoxide) as a reactant comprising carbon to effect a carbothermic reaction that produces a rare earth carbide. The rare earth carbide in turn is reacted with one or more compound-forming elements and one or more strong carbide-forming elements to form a desired rare earth compound or material and a carbide of the carbide-forming element. The reaction of the rare earth carbide, the compound-forming element and the carbide-forming element can occur in the solid state without being rendered molten, although the reaction can be carried out with the reactants in the molten state.

For purposes of illustrating and not limiting the present invention, the production of $Nd_2Fe_{14}B$ compound will be described pursuant to an embodiment of the invention. In particular, $Nd_2O_3$ powder in the size range of 5 to 10 microns was mixed with carbon powder such as graphite or amorphous carbon in the powder size range of 5 to 10 microns in atomic ratio of 2 to 3. The mixture was heated to 1800 degrees C. to effect a carbothermic reaction that yielded $Nd_2C_3$ powder only. The $Nd_2C_3$ powder then was mixed or blended with 1) $TiFe_2$ powder (size range of less than 106 microns) as a reactant source of a refractory metal (i.e. Ti) that is a stronger carbide former than the rare earth involved, 2) Fe powder (size range of less than 44 microns) as a reactant source of compound-forming element, and 3) $Fe_2B$ powder (size range of less than 106 microns) as a reactant source of a compound-forming element. The $TiFe_2$ powder was made by arc melting elemental constituents in stoichiometric ratios and then grinding the solidified material to form powder. The Fe powder was obtained from SCM Metal Products, Inc., 2601 Weck Drive, Research Triangle Park, N.C. 27709. The $Fe_2B$ powder was made by arc melting elemental constituents in stoichiometric ratios and then grinding the solidified material to form powder.

The powders were blended together by a V-blender under inert atmosphere in relative amounts required for producing the compound $Nd_2Fe_{14}B$, which is a magnetic phase or compound used in permanent magnet applications.

The intimate mixture of powders was heated to 1150 degrees C. in an atmosphere of argon for a time of 30 minutes to produce the $Nd_2Fe_{14}B$ compound and TiC dispersed in the compound as fine precipitates in respective volume %'s of 99% and 1%. The composition of the Nd—Fe—B compound was confirmed to be $Nd_2Fe_{14}B$ by X-ray diffraction anaylsis of the reaction product. This reaction can be carried out in the solid state at a temperature from about 1125 to about 1175 degrees C. to produce fine grained $Nd_2Fe_{14}B$ compound or phase having refractory metal carbide precipitates uniformly dispersed therein for grain refinement purposes. Isotropic magnets may be produced directly by such solid state reaction technique. Also, the solid state reaction can be conducted under uniaxial stress conditions applied on the mixture so as to produce an aligned microstructure having enhanced magnetic properties in a direction. The solid state technique to produce the rare earth-transition metal compound yields cost savings as compared to molten reaction of the powder mixture followed by ingot casting the molten reacted material. The $Nd_2Fe_{14}B$ compound can be subsequently heated to a suitable elevated temperature to modify the grain structure, if desired.

The aforementioned reaction alternately can be carried out in the molten state by heating the aforementioned mixture of powders to a temperature from about 1250 to about 1400 degrees C. The molten mixture is cast into ingot or other shapes after reaction for further processing.

Regardless of whether the rare earth-transition metal compound is formed by solid or molten state reaction, the cost of producing the rare earth carbide reactant pursuant to the method of the invention should be at least an order of magnitude cheaper than producing rare earth metal reactant used in previous production processes for like magnetic materials. The cost of producing rare earth-transition metal magnet compounds can thereby be substantially reduced using a rare earth carbide reactant in accordance with the invention.

In lieu of $Nd_2C_3$ as the rare earth carbide, the present invention can be practiced using $NdC_2$ or other rare earth carbides such as non-stoichiometric or mixed carbides; i.e. $Nd_2C_3+NdC_2$. Moreover, the source of boron alternately can be FeB or other transition metal-boron materials such as non-stoichiometric or mixed borides; i.e. $Fe_2B+FeB$. Refactory metals other than Ti such as Hf, Zr and other Group IVA and VA refractory metals of the Periodic Table can be used as strong carbide formers in the practice of the invention depending upon the rare earth compounds to be made. The invention is not limited to any particular reactant(s) described herein in detail only for purposes of illustration.

For purposes of further illustrating and not limiting the present invention, the production of $LaNi_5$ compound will be described pursuant to an embodiment of the invention. In particular, $La_2O_3$ powder in the size range of 5 to 10 microns was mixed with carbon or graphite described above in a molar ratio of 1 to 3. The mixture was heated to 1800 degrees C. to effect a carbothermic reaction that yielded $La_2C_3$ powder. The $La_2C_3$ powder then was mixed or blended with 1) Ti powder (size less than 106 microns) as a source of refractory metal and 2) Ni powder (size less than 106 microns) as a source of compound-forming element. The powders were blended together by a V-blender under inert atmosphere in amounts required for producing the compound $LaNi_5$, which is a hydrogen storage material.

The intimate mixture of powders was heated to 975 degrees C. in an atmosphere of argon for a time of 30 minutes to produce the $LaNi_5$ compound and TiC dispersed in the compound as fine precipitates in respective volume %'s of 99% and 1%. The composition of the compound was confirmed to be $LaNi_5$ by X-ray diffraction anaylsis of the reaction product. This reaction can be carried out in the solid state at a temperature from about 950 to about 1050 degrees C. to produce fine grained $LaNi_5$ compound or phase having refractory metal carbide precipitates dispersed therein for grain refinement purposes. Alternately, the reaction can be carried in the molten state by heating the mixture of powders to a temperature from about 1420 to about 1520 degrees C.

Although the present invention has been described in detail with respect to certain embodiments thereof, the invention is not so limited and modifications and changes thereto can be made within the scope of the invention as set forth in the appended claims.

We claim:

1. A method of making a rare earth compound, comprising reacting a rare earth carbide, a compound-forming element, and a carbide-forming element that forms a carbide more thermodynamically favorable than said rare earth carbide, so as to form the rare earth compound and a carbide of said carbide-forming element as a separate carbide phase in said compound.

2. The method of claim 1 including carbothermically reacting a rare earth oxide to form said rare earth carbide.

3. The method of claim 2 wherein said rare earth oxide is carbothermically reacted with a reactant comprising carbon.

4. The method of claim 1 wherein said rare earth carbide, said compound-forming element, and said carbide-forming element are mixed and then heated to form said rare earth compound and said carbide of said carbide-forming element.

5. The method of claim 4 wherein said rare earth compound and said carbide of said carbide-forming element are formed by solid state reaction of said rare earth carbide, said compound-forming element, and said carbide-forming element as solids.

6. The method of claim 1 wherein said carbide-forming element comprises a refractory metal alone or in combination with another element.

7. A method of making a rare earth-transition metal compound, comprising carbothermically reacting a rare earth oxide to form a rare earth carbide and heating the rare earth carbide, a compound-forming element, and a carbide-forming element that forms a carbide more thermodynamically favorable than said rare earth carbide so as to form the rare earth-transition metal compound and a carbide of said carbide-forming element as a separate carbide phase in said compound.

8. The method of claim 7 wherein said rare earth oxide is carbothermically reacted with a reactant comprising carbon.

9. The method of claim 7 wherein said rare earth carbide, said transition metal, and said carbide-forming element are mixed and then heated to form said rare earth-transition metal compound and said carbide of said carbide-forming, element.

10. The method of claim 9 wherein said rare earth compound and said carbide of said carbide-forming element are formed by solid state reaction of said rare earth carbide, said transition metal, and said carbide-forming element as solids.

11. The method of claim 7 wherein said carbide-forming element comprises a refractory metal alone or in combination with another element.

12. A method of making a rare earth-transition metal-boron compound, comprising carbothermically reacting a rare earth oxide to form a rare earth carbide and heating the rare earth carbide in the presence of reactants comprising a transition metal, boron, and a carbide-forming element that forms a carbide more thermodynamically favorable than said rare earth carbide so as to form the rare earth -transition metal-boron compound and a carbide of said carbide-forming element as a separate carbide phase in said compound.

13. The method of claim 12 wherein said rare earth oxide is carbothermically reacted with a reactant comprising carbon.

14. The method of claim 12 wherein the rare earth carbide and the reactants are mixed and then heated to form said rare earth-transition metal-boron compound and said carbide of said carbide-forming element.

15. The method of claim 14 wherein said rare earth compound and said carbide of said carbide-forming element are formed by solid state reaction of said rare earth carbide and said reactants.

16. The method of claim 12 wherein said carbide-forming element comprises a refractory metal alone or in combination with another element.

* * * * *